United States Patent
Ambrosetti

(10) Patent No.: US 11,014,464 B2
(45) Date of Patent: May 25, 2021

(54) MOBILE CHARGING DEVICE FOR AN ELECTRIC VEHICLE

(71) Applicant: AUDI AG, Ingolstadt (DE)

(72) Inventor: Sebastien Ambrosetti, Pfaffenhofen a. d. Ilm (DE)

(73) Assignee: AUDI AG, Ingolstadt (DE)

( * ) Notice: Subject to any disclaimer, the term of this patent is extended or adjusted under 35 U.S.C. 154(b) by 279 days.

(21) Appl. No.: 16/402,326

(22) Filed: May 3, 2019

(65) Prior Publication Data

US 2019/0375306 A1 Dec. 12, 2019

(30) Foreign Application Priority Data

Jun. 8, 2018 (DE) .......................... 102018209106.4

(51) Int. Cl.
| | |
|---|---|
| *B60L 53/30* | (2019.01) |
| *B60L 53/53* | (2019.01) |
| *B60L 53/80* | (2019.01) |
| *B60L 53/12* | (2019.01) |
| *H02J 7/02* | (2016.01) |

(52) U.S. Cl.
CPC ............... *B60L 53/30* (2019.02); *B60L 53/12* (2019.02); *B60L 53/53* (2019.02); *B60L 53/80* (2019.02); *H02J 7/025* (2013.01); *B60Y 2200/91* (2013.01); *B60Y 2300/91* (2013.01)

(58) Field of Classification Search
CPC ...................................................... B60L 53/30
USPC ......................................................... 320/108
See application file for complete search history.

(56) References Cited

U.S. PATENT DOCUMENTS

| | | | | |
|---|---|---|---|---|
| 8,791,596 | B2 * | 7/2014 | Fein ........................... | F03D 9/25 307/43 |
| 8,858,152 | B1 * | 10/2014 | McDaniel ............... | B60L 50/64 414/809 |
| 9,592,742 | B1 | 3/2017 | Sosinov et al. | |
| 2017/0151881 | A1 * | 6/2017 | Lee ....................... | B60G 17/017 |

FOREIGN PATENT DOCUMENTS

| | | |
|---|---|---|
| DE | 102012214750 A1 | 11/2013 |
| DE | 102016014034 A1 | 5/2017 |
| DE | 102015225789 A1 | 6/2017 |
| DE | 102016221064 A1 | 4/2018 |
| DE | 102017205233 A1 | 10/2018 |
| JP | 2009-213337 A | 9/2009 |

OTHER PUBLICATIONS

European Search Report dated Oct. 21, 2019, in corresponding European patent application No. 19172777.5 including partial machine-generated English language translation; 15 pages.
Examination Report dated Mar. 18, 2019 of corresponding German application No. 102018209106.4; 20 pages.

* cited by examiner

*Primary Examiner* — Jerry D Robbins
(74) *Attorney, Agent, or Firm* — Maier & Maier, PLLC

(57) ABSTRACT

A method for charging an electric vehicle during a travel of the electric vehicle, with the following steps: Providing a mobile charging device, arranging the mobile charging device underneath the traveling electric vehicle, fastening the mobile charging device to a bottom of the electric vehicle, transferring electric energy out of the mobile charging device to the battery of the electric vehicle, separating the mobile charging device from the bottom of the electric vehicle and providing the mobile charging device again.

10 Claims, 3 Drawing Sheets

MOBILE CHARGING DEVICE FOR AN ELECTRIC VEHICLE

FIELD

The invention relates to a method for charging an electric vehicle during the travel of the electric vehicle. Furthermore, the invention relates to a mobile charging device for an electric vehicle and to an electric vehicle.

BACKGROUND

Electric vehicles, in particular electric cars, comprise an electromotor for generating a propulsion and comprise a battery which stores electric energy, and for operating the electromotor. The electric energy stored in the battery determines a range of the electric vehicle, i.e., limits a maximum driving stretch without a recharging of the battery of the electric vehicle. Maximum ranges of current electric vehicles are usually approximately 500 km.

The charging of the battery can take a long time. Starting from a low charging state of the battery to a full charge can take several hours of charging time. For charging, the electric vehicle is connected to a stationary, i.e. fixed charging station or the like and cannot be moved during the charging time.

Once the battery has reached a critical, low charging state during a travel, i.e., the electric energy stored in the battery gets low, the travel must be interrupted for charging the battery, which adversely affects the handling of the electric vehicle. In order to avoid an interruption of the travel, the battery must be sufficiently charged in time before a travel is undertaken, as a result of which a spontaneous and uninterrupted travel over a long driving stretch is practically excluded. Aside from this, a charging of the electric vehicle during the travel and consequently a rather long interruption of the travel is basically unavoidable for the driving stretch which is longer than the range of the electric vehicle. In addition, environmental factors such as, for example, an air temperature, a detour or a high traffic volume can reduce the range of the electric vehicle in an unforeseen manner.

Accordingly, there is a need to improve the manageability of the electric vehicle, in particular for long driving stretches. In order to avoid interruptions of a travel of the electric vehicle for charging the battery, solutions are considered which allow a charging during the travel, that is, do not require any standing time of the electric vehicle at a charging station.

DE 10 2012 214 750 A1 offers such a solution and discloses a method for charging an electric vehicle during a travel of the electric vehicle. In the method, electric energy is transferred from an overhead line to the electric vehicle via a charging vehicle galvanically connected by a sliding contact to the overhead line. During the transfer of the electric energy the electric vehicle is mechanically and electrically connected to the charging vehicle by a coupling device and travels at a predetermined distance behind the charging vehicle.

This method does make possible a charging of the battery of the electric vehicle during the travel. However, the necessary infrastructure is very complex since appropriate overhead lines must be provided over long travel sections. In addition, the electric vehicle necessarily moves during the entire charging time in the track and at the speed of the charging vehicle, which greatly limits the agility of the electric vehicle and the travel time can be lengthened as a consequence of the charging.

DE 10 2015 225 789 A1 discloses another mobile charging device. The mobile charging device comprises a battery and travels on demand from an available system independently (autonomously) to a position of an electric vehicle in order to transfer electric energy stored in the battery by a coupling device which is both mechanical as well as electric to a battery of the electric vehicle. The transfer of the electric energy can also take place during a travel of the electric vehicle.

Accordingly, this solution is based on the fact that the mobile charging device comprises a comprehensive self-driving function. It makes do without an expensive infrastructure such as an overhead system and can also ensure a charging of the battery of the electric vehicle even in areas without a charging station or in an electric vehicle broken down far from a charging station.

However, it requires a mobile charging device which moves independently in street traffic. Such a mobile charging device is very complex and increases the density of the street traffic, i.e. dense traffic, and also increases the risk of an accident for each participant in the street traffic. In addition, the mechanical coupling between the mobile charging device traveling in front and the electric vehicle following it can be considered as disadvantageous.

Another method for charging a vehicle battery of an electric vehicle during the travel of the electric vehicle is described in DE 10 2016 014 034 A1. In this method the electric vehicle travels behind a mobile charging station at the same speed as the mobile charging station. During this time, electric energy is transferred from the mobile charging station via a magnetic induction path to the battery of the electric vehicle, wherein the magnetic induction path is formed by an induction plate arranged on a rear side of the mobile loading station and by an induction plate arranged on a front side of the electric vehicle.

Accordingly, a mechanical coupling between the mobile charging station and the electric vehicle is not provided. However, the electric vehicle must also travel in this solution at the same speed as the mobile charging station and at a predetermined distance behind the mobile charging station in order to ensure a functioning of the magnetic induction path during the charging time.

SUMMARY

The invention is therefore based on the object of indicating a method which avoids the described disadvantages. In addition, it is an object of the invention to create a mobile charging device and an electric vehicle for carrying out the method.

A subject matter of the invention is a method for charging an electric vehicle during a travel of the electric vehicle.

According to the invention, the method comprises the following steps:
  providing a mobile charging device;
  arranging the mobile charging device under a traveling electric vehicle;
  fastening the mobile charging device to a bottom of the electric vehicle;
  transferring electric energy from the mobile charging device to the electric vehicle;
  separating the mobile charging device from the bottom of the electric vehicle; and
  providing the mobile charging device again.

The mobile charging device can be provided, for example, on an expressway pavement section. For transferring the electric energy, the mobile charging device is arranged, after a request from a driver of the electric vehicle to be charged, on a bottom of the electric vehicle and fixed there relative to the electric vehicle. The arranging and fastening of the mobile charging device under the electric vehicle can take place during the travel of the electric vehicle or during a brief stop of the electric vehicle.

In one embodiment the mobile charging device is provided with a charged battery. The charged battery stores electric energy which can be made available for the electric vehicle by the mobile charging device during the travel of the electric vehicle.

In a preferred embodiment the electric energy is transferred from the battery of the mobile charging device via a magnetic induction path to the battery of the electric vehicle. The magnetic induction path makes possible a contactless transfer of electric energy, i.e., there is no galvanic connection during the transfer between the charging device and the electric vehicle. Accordingly, contact problems such as, for example, a corrosion of contact surfaces are avoided.

Alternatively or additionally, the battery of the mobile charging device can be placed into the electric vehicle, in particular as a replacement of the discharged battery of the electric vehicle. In this manner the electric energy is transferred purely mechanically, as a result of which distinctly less time is required for the transfer than via a magnetic induction path. However, it must be ensured that the electric vehicle is not cut off at any time from the electric energy during a replacement of the battery. This can be made possible, for example, with a modularly designed battery which comprises a plurality of battery modules connected in parallel. In a modular battery, a battery module can be replaced while the remaining battery modules continue to supply the electric vehicle with electric energy.

In another alternative embodiment the electric energy is transferred from a battery of another electric vehicle by another mobile charging device fastened on the other electric vehicle via at least one other magnetic induction path. In other words, in this variant a transfer of electric energy takes place between two electric vehicles which are each inductively coupled to a mobile charging device. In addition, the two charging devices are electrically and/or magnetically coupled to one another. In this manner a transfer of electric energy from the battery of the other electric vehicle can take place via at least two magnetic induction paths to the battery of the electric vehicle. If the two mobile charging devices each have one battery, electric energy can be alternatively or additionally transferred between the two batteries of the mobile charging devices.

In other embodiments the electric vehicle and the other electric vehicle form a traveling convoy and travel during the transfer of the electric energy at a predetermined distance behind one another in such manner that a magnetic induction path is formed between the two mobile charging devices. The two participating electric vehicles set such a distance between one another by special driving assistance systems so that a third magnetic induction path is formed between the two mobile charging devices.

The traveling convoy can be formed by the two electric vehicles and by at least one third vehicle provided with a mobile charging device. The traveling convoy is therefore formed by more than two electric vehicles. In particular, even vehicles driven by an internal combustion engine can also participate in such a traveling convoy without transferring or receiving electric energy themselves, with an appropriate savings of fuel. In this case the mobile charging device fastened to a vehicle driven by an internal combustion engine serves only to transfer energy to and/or from another mobile charging device which is fastened on a vehicle traveling in front in the traveling convoy or on a vehicle traveling behind in the traveling convoy. Accordingly, the mobile charging device fastened on a vehicle driven by an internal combustion engine does not have to be charged before being used.

In preferred embodiments the mobile charging device is coupled in particular electromagnetically to the electric vehicle for the fastening and is locked, in particular electromechanically, in particular in the coupled state to the bottom of the electric vehicle. As a result of the electromagnetic coupling, the relative arrangement of the mobile charging device and of the electric vehicle is fixed in such a manner that the mobile charging device moves synchronously with the electric vehicle without using its own drive. In addition, the mobile charging device can be raised as a consequence of the electromagnetic coupling and separated from a pavement, as a result of which the mobile charging device does not need its own drive during the transfer of the electric energy and in addition the friction losses of the arrangement formed by the electric vehicle and the mobile charging device are reduced. Furthermore, electric energy can be saved for the electromagnetic coupling if the mobile charging device is locked underneath the electric vehicle in the coupled state by electromechanically actuated actuators.

In advantageous embodiments the mobile charging device is provided in a supply unit and/or is accelerated for arranging and/or is moved out of the supply unit under the electric vehicle, in particular on a straight trajectory and/or moved into a supply unit for providing it again. Supply units can be provided, for example, on straight travel sections of expressways, in particular on expressway entrances and expressway exits. The acceleration or braking of the mobile charging device can take place by its own electric drive as well as by external acceleration means or braking means such as, for example, a catapult or a friction stretch. If the mobile charging device is moved on a defined, straight trajectory under the electric vehicle, an ability to steer the mobile charging device is not necessary, which is associated with a simple construction of the mobile charging device.

Subject matter of the invention is also a mobile charging device for charging an electric vehicle during a travel of the electric vehicle, in particular in a method according to the invention. The mobile charging device makes it possible to charge the battery of the electric vehicle without interrupting the travel of the electric vehicle for stopping at a charging station. This is associated with a corresponding shortening of the driving time and with an improved comfort.

The charging device according to the invention comprises a frame, in particular a receptacle for a battery which receptacle is fastened on the frame, comprises a plurality of in particular driven rollers rotatably supported on the frame, at least one and especially three induction coils arranged on the frame, at least one sensor for detecting a position relative to the electric vehicle, in particular a communication module for setting up a data connection with the electric vehicle, an in particular electromagnetic coupling device connected to the frame and in particular an especially electromechanical locking device provided on the frame. Furthermore, the mobile charging device can comprise a replacement mechanism with at least one compact electric cylinder designed to carry out an automatic replacement of the vehicle battery.

The receptacle can also be designed to receive several battery modules of a battery. The rollers can also be designed as wheels and/or be provided with an electric wheel hub motor. A separate battery of the frame can be provided for operating the electric wheel hub motors. Two of the three induction coils can be arranged on a front side and on a rear side of the frame in order to be able to form a magnetic induction path with a leading frame or a following frame. The third induction coil can be arranged in such a manner in a middle section of the frame between the front side and the rear side that a position of the third induction coil corresponds to a position of an induction coil of the electric vehicle when the mobile charging device is fixed underneath the electric vehicle. The at least one sensor can be provided, for example, as an inductive sensor and the communication module can be designed for a radio connection (Car2X, BT beacon). The electromagnetic coupling device can be designed to raise the mobile charging device, to separate it from the pavement and to bring it in contact with a bottom surface of the electric vehicle. The locking device can comprise electromechanical actuators which actuate locking means or engagement means for fastening the mobile charging device on the bottom of the electric vehicle.

A mobile charging device used exclusively for vehicles driven by an internal combustion engine can have a simplified construction in comparison to a mobile charging device also suitable for electric vehicles. For example, it does not have to have a receptacle for a battery, nor does it need a third induction coil in a middle section of the frame.

Furthermore, subject matter of the invention is an electric vehicle which is designed to be charged during travel by a mobile charging device, in particular by a mobile charging device according to the invention, especially in a method according to the invention. The electric vehicle is accordingly not dependent on a stationary charging station for charging its battery and consequently can be readily managed as regards its energy management.

According to the invention the electric vehicle comprises an induction coil corresponding to an induction coil of the mobile charging device, its underside is designed to be coupled to the mobile charging device and in particular for locking the coupled mobile charging device, and the electric vehicle comprises in particular a driving assistance system configured to form a traveling convoy with another electric vehicle in such a manner that the two electric vehicles travel at a predetermined distance behind one another. The induction coil is arranged in such a manner in the electric vehicle that it forms a magnetic induction path with the induction coil of the mobile charging device if the mobile charging device is coupled to the bottom of the electric vehicle or is locked to or engaged with it. The driving assistance system is configured to arrange the mobile charging device coupled to the electric vehicle relative to a mobile charging device coupled to another electric vehicle in such a manner that another magnetic induction path is formed between the mobile charging devices. In an activated driving assistance system (piloted column travel), a driver of the electric vehicle does not have to steer the vehicle. A transfer of the electric energy between the electrical vehicles is possible within a traveling convoy formed by several electric vehicles.

BRIEF DESCRIPTION OF THE DRAWINGS

The invention is schematically shown in the drawings using embodiments and is described further with reference made to the drawings. In the drawings.

DETAILED DESCRIPTION

Figure 1:
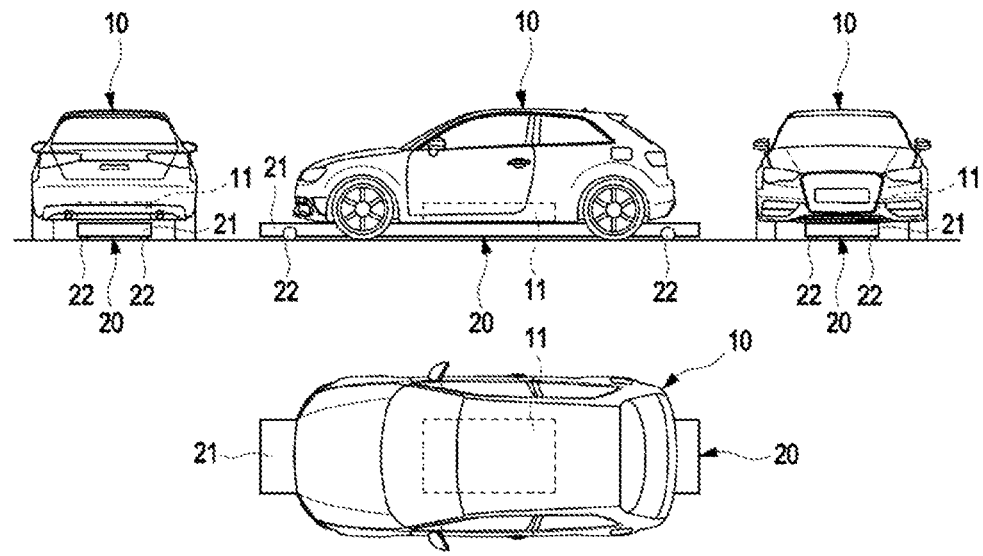
FIG. 1 shows a schematic representation of a rear view, a side view, a front view and a top view of an arrangement with an embodiment of the mobile charging device according to the invention and of an embodiment of the electric vehicle according to the invention.
Figure 2:
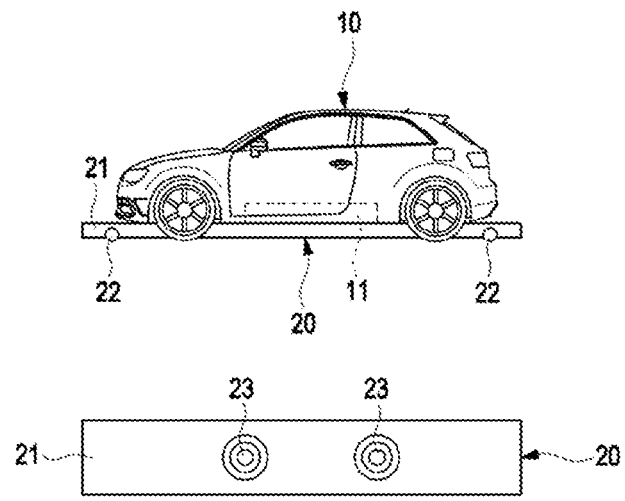
FIG. 2 shows a schematic representation of a top view of the mobile charging device shown in FIG. 1.

FIGS. 1 and 2 show a schematic representation of a rear view, a side view, a front view and a top view of an arrangement with an embodiment of mobile charging device 20 according to the invention and with an embodiment of electric vehicle 10 according to the invention.

Mobile charging device 20 serves to charge electric vehicle 10 during a travel of electric vehicle 10 and comprises a frame 21, a battery, not visible, integrated in frame 21 and four rollers 22 rotatably supported on frame 21. Furthermore, mobile charging device 20 comprises a non-visible wheel hub motor for each roller 22 for automatically driving the respective associated roller 22.

Figure 4:
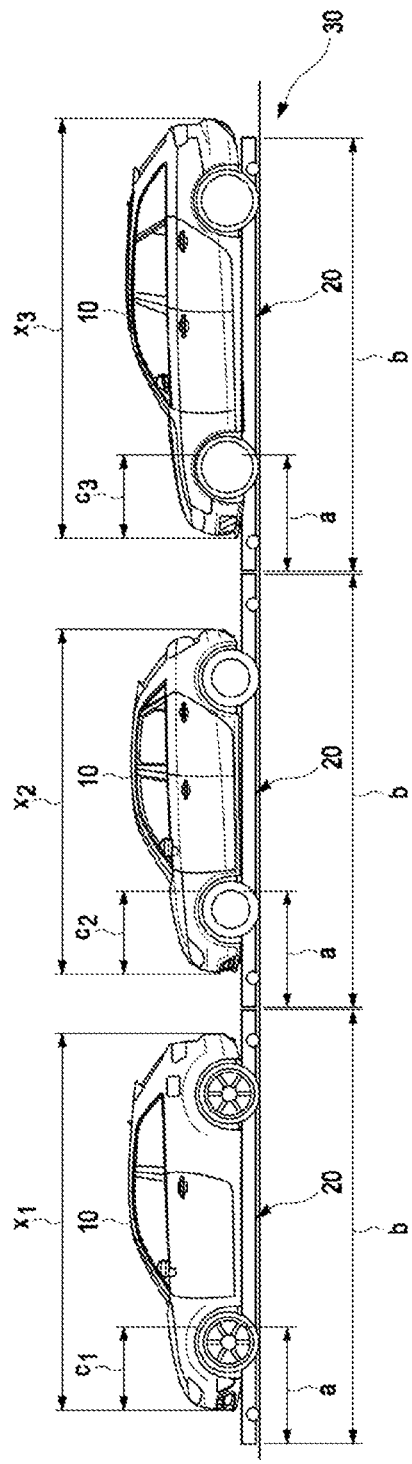
FIG. 4 shows a schematic representation of the side view of three arrangements shown in FIG. 1 forming a traveling convoy.

Charging device 20 furthermore comprises two induction coils 23 arranged in a middle section of frame 21 between a front side of frame 21 and a rear side of frame 21 and comprises two further non-visible induction coils arranged on the front side of frame 21 and on the rear side of frame 21 for forming an inductive transfer stretch to an electric vehicle 10 or to a frame 21 of another mobile charging device 20 within a traveling convoy 30 (see FIG. 4).

Other components of charging device 20 are one or more inductive sensors for detecting a position relative to electric vehicle 10, a communication module for setting up a data connection to electric vehicle 10, an electromagnetic coupling device connected to frame 21 and a locking device provided on frame 21 and with locking means or engagement means and electromechanically actuatable actuators associated with the latter. These components are not illustrated in the figures and can be designed in a purposeful manner by the person skilled in the art and arranged on frame 21.

Electric vehicle 10 is designed to be charged during travel by mobile charging device 20 and comprises a battery 11. A bottom of electric vehicle 10 is designed for coupling mobile charging device 20 and in particular for locking or engaging coupled, mobile charging device 20, therefore, it comprises corresponding locking means or engagement means.

Furthermore, electric vehicle 10 comprises a non-visible driving assistance system which is configured in such a manner as to form a traveling convoy 30 (see FIG. 4) with another electric vehicle 10 so that the two electric vehicles 10 travel one behind the other at a predetermined distance.

Figure 3:
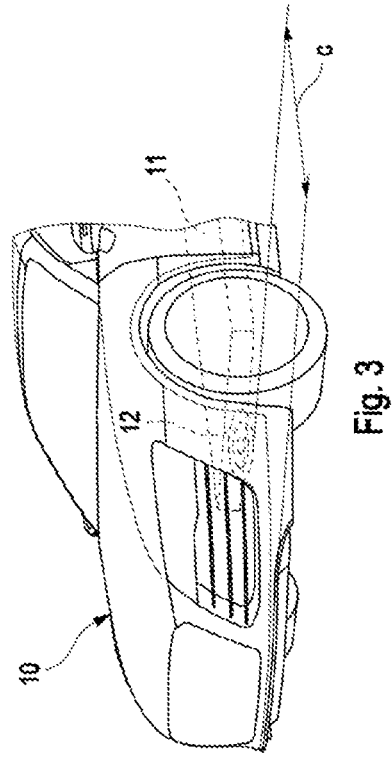
FIG. 3 shows a perspective representation of a partial view of the electric vehicle shown in FIG. 1.

FIG. 3 shows a perspective representation of a partial view of electric vehicle 10 shown in FIGS. 1 and 2. Electric vehicle 10 comprises an induction coil 12 for forming a magnetic induction path and which is provided close to the bottom at a distance c measured from a front end of electric vehicle 10.

In order to charge electric vehicle 10 during a travel of electric vehicle 10, at first mobile charging device 20 is provided in a supply unit with a charged battery. After a request of a driver of electric vehicle 10, charging device 20 is automatically accelerated by the wheel hub motors, moved out of the supply unit on a straight trajectory to traveling electric vehicle 10 and arranged below traveling electric vehicle 10, wherein the inductive sensors and the communication module are used for the relative alignment of mobile charging device 20 and of electric vehicle 10.

In another step mobile charging device 20 is fastened on the bottom of electric vehicle 10 in that mobile charging device 20 is coupled by means of the electromagnetic coupling device to electric vehicle 10 and is fixed, i.e., locked in the coupled state by actuating the locking means by means of the electromechanical actuators to the bottom of electric vehicle 10. In the locked state of charging device 20, an induction coil 23 of mobile charging device 20 and induction coil 12 of electric vehicle 10 form a magnetic induction path.

Then, the electric energy stored in the charged battery of mobile charging device 20 is transferred during the travel of electric vehicle 10 via the formed induction path to electric vehicle 10. After the transfer of the electric energy has taken place, mobile charging device 20 is separated from the bottom of electric vehicle 10 by unlocking and decoupling, moved on a straight trajectory into another supply unit and provided again there for carrying out the previously described method. A person skilled in the art understands that the supply units have a storage management system and that mobile charging devices 20 must be regularly transported between supply units in order to provide a sufficient number of mobile charging devices 20 at all times in each supply unit.

FIG. 4 shows a schematic representation of a side view of a traveling convoy 30 formed by three arrangements shown in FIG. 1. Traveling convoy 30 comprises three electric vehicles 10 on each of whose bottoms a mobile charging device 20 is fixed.

Electric vehicles 10 each have different lengths $x_1$, $x_2$, $x_3$ and non-visible induction coils 12 are provided close to the bottom at a distance $c_1$, $c_2$, $c_3$ measured from the front end of the respective electric vehicle 10.

On the other hand, charging devices 20 have identical lengths b and non-visible induction coils 23 are provided at a distance a measured from the front end of frame 21 of the respective mobile charging device 20.

The following relationships apply for the distances and lengths of electric vehicles 10 and of frames 21:

$c_{1,2,3} < a$ and $x_{1,2,3} < b$, i.e., frames 21 are longer than electric vehicles 10 and therefore project from electric vehicles 10 to the front and to the rear, and induction coils 23 of mobile charging devices 20 are spaced further from the front ends of frame 21 than induction coils 12 from the front ends of electric vehicles 10.

Each charging device 20 is fastened on an electric vehicle 10 in such a manner that induction coil 23 of mobile charging device 20 and induction coil 12 of electric vehicle 10 are arranged facing each other and form a magnetic induction path.

Electric vehicles 10 are arranged behind each other at predetermined distances in such a manner that the smallest possible intermediate spaces are formed between charging devices 20 fixed on them so that in each case one induction coil arranged on a rear side of a frame 21 and one induction coil arranged on a front side of a front frame 21 form a magnetic induction path.

Within traveling convoy 30, the electric energy from a battery 11 of a second electric vehicle 10 is transferred by means of another mobile charging device 20 fastened on second electric vehicle 10 via at least one other magnetic induction path to a first electric vehicle 10. To this end, second electric vehicle 10 and first electric vehicle 10 travel at a predetermined distance behind one another in such a manner that another magnetic induction path is formed between the two associated mobile charging devices 20.

Third vehicle 10 of traveling convoy 30 does not have to be an electric vehicle but rather it can be a vehicle driven by an internal combustion engine. In the latter instance, there is no transfer of electric energy to or from third vehicle 10. However, third vehicle 10 can profit from participating in traveling convoy 30 thanks to its own savings of fuel.

Figure 5:
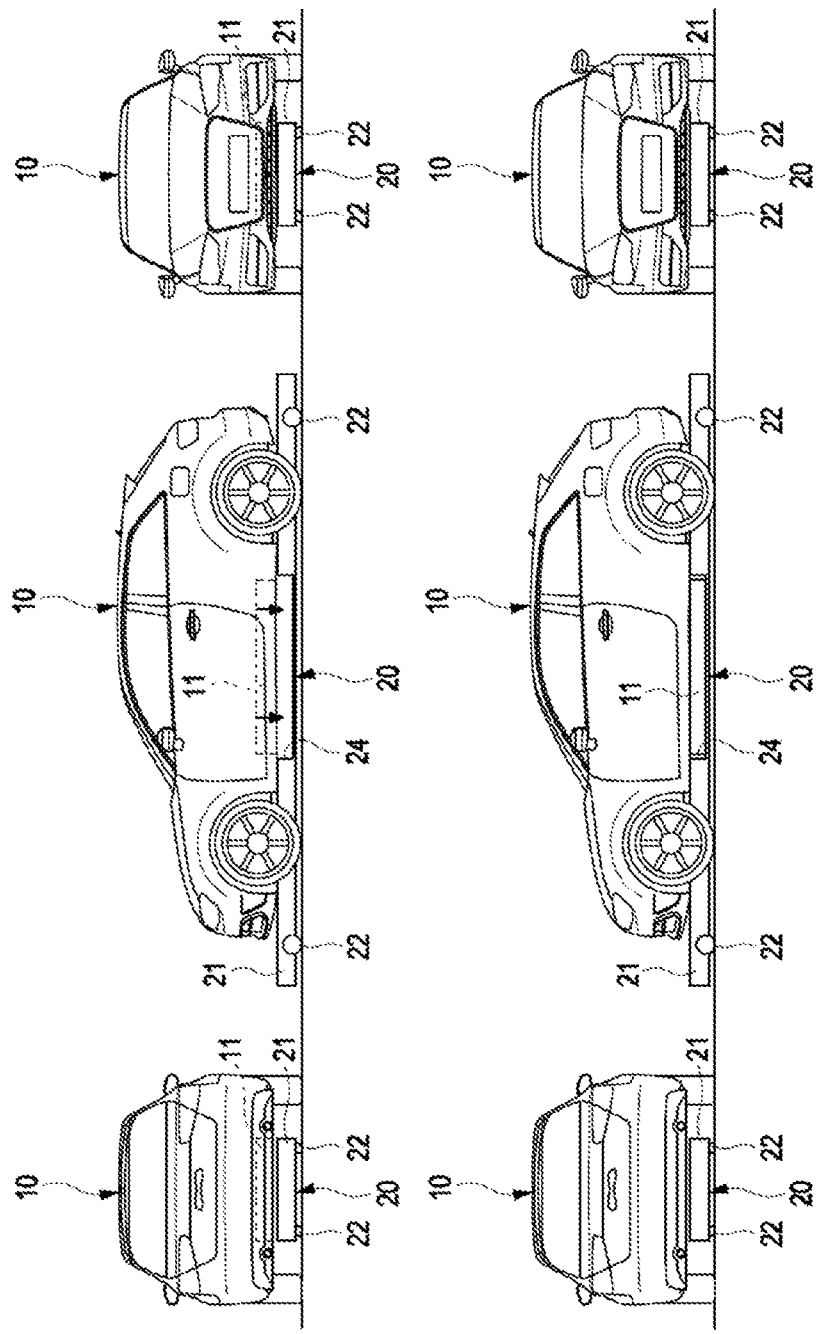
FIG. 5 shows a schematic representation of a rear view, a side view and a front view of an arrangement with another embodiment of the mobile charging device according to the invention and of another embodiment of the electric vehicle according to the invention in two phases of an embodiment of the method according to the invention.

FIG. 5 shows a schematic representation of a rear view, a side view and a front view of an arrangement with another embodiment of mobile charging device 20 according to the invention and with another embodiment of electric vehicle 10 according to the invention in two phases of an embodiment of the method according to the invention. Electric vehicle 10 and mobile charging device 20 have the same basic construction as in the arrangement shown in FIGS. 1 to 4. Deviating from the latter arrangement, a non-shown replacement mechanism with a compact electric cylinder is provided on frame 21 and a receptacle 24 for receiving battery 11 of electric vehicle 10 is formed. Electric vehicle 10 is designed in a corresponding manner to separate battery 11 during travel and place it in receptacle 24 of coupled frame 21.

In the method, a charged battery provided by mobile loading device 20 is placed into electric vehicle 10, whereas in exchange a discharged battery 11 of electric vehicle 10 is placed in receptacle 24 of mobile charging device 20. In order not to cut electric vehicle 10 off from the electric energy during the exchanging, battery 11 can be designed to be modular and to comprise a plurality of battery modules connected in parallel. The transfer of electric energy from mobile charging device 20 to electric vehicle 10 takes place in this case by a successive exchange of individual battery modules.

A significant advantage of the method according to the invention is that even in the case of long driving stretches or in the case of an unforeseen shortening of the range of electric vehicle 10, a trip does not have to be interrupted in order to charge battery 11 of electric vehicle 10. This distinctly improves the manageability of electric vehicle 10, which is associated with a greater acceptance of electric vehicle 10. Another advantage is that the agility of electric vehicle 10 is not significantly limited by coupled mobile charging device 20. Furthermore, the suggested method offers a high degree of flexibility regarding the manner of how the electric energy is transferred to electric vehicle 10 and from where electric energy is transferred to electric vehicle 10.

LIST OF REFERENCE NUMERALS 10 electric vehicle
11 battery
12 induction coil
20 mobile charging device
21 frame
22 roller
23 induction coil
24 receptacle
c, $c_1$, $c_2$, $c_3$ distance
$x_1$, $x_2$, $x_3$ length
a distance
b length

The invention claimed is:

1. A method for charging an electric vehicle, during a travel of the electric vehicle, comprising:
   providing a mobile charging device;
   arranging the mobile charging device under a traveling electric vehicle;
   fastening the mobile charging device to a bottom of the electric vehicle;
   transferring electric energy from the mobile charging device to the electric vehicle;
   separating the mobile charging device from the bottom of the electric vehicle; and
   making the mobile charging device available again.

2. The method according to claim 1, wherein the mobile charging device is provided with a charged battery.

3. The method according to claim 2, wherein the electric energy is transferred from the battery of the mobile charging device via a magnetic induction path to the battery of the electric vehicle and/or the battery of the mobile charging device is set into the electric vehicle, in particular as a replacement of a discharged battery of the electric vehicle.

4. The method according to claim 1, wherein the electric energy is transferred from a battery of another electric vehicle by another mobile charging device fastened on the other electric vehicle via at least one other magnetic induction path.

5. The method according to claim 4, wherein the electric vehicle and the other electric vehicle form a traveling convoy and travel during the transfer of the electric energy at a predetermined distance behind one another in such manner that a magnetic induction path is formed between the two mobile charging devices.

6. The method according to claim 5, wherein the traveling convoy is formed by the two electric vehicles and by at least one third vehicle provided with a mobile charging device.

7. The method according to claim 1, in which the mobile charging device is coupled in particular electromagnetically to the electric vehicle for fastening and is locked, in particular electromechanically, in particular in the coupled state to the bottom of the electric vehicle.

8. The method according to claim 1, in which the mobile charging device is provided in a supply unit and/or is accelerated for arranging and/or is moved out of the supply unit under the electric vehicle, in particular on a straight trajectory, and/or is moved into a supply unit for providing it again.

9. A mobile charging device for charging an electric vehicle during a travel of the electric vehicle, in particular in a method according to claim 1, comprising:
   a frame, a receptacle for a battery which receptacle is fastened on the frame, a plurality of in particular driven rollers rotatably supported on the frame, at least one and especially three induction coils arranged on the frame, at least one sensor for detecting a position relative to the electric vehicle, in particular a communication module for setting up a data connection with the electric vehicle, an in particular electromagnetic coupling device connected to the frame and in particular an especially electromechanical locking device provided on the frame.

10. An electric vehicle which is designed to be charged during a travel by a mobile charging device, in particular a mobile charging device according to claim 9, comprising:
   a battery and an induction coil corresponding to an induction coil of the mobile charging device, and whose bottom is designed for coupling the mobile charging device and in particular for locking the coupled mobile charging device and which has in particular a driving assistance system which is configured in such a manner as to form a traveling convoy with another electric vehicle in such a manner that the two electric vehicles travel at a predetermined distance behind one another.

* * * * *